United States Patent [19]

Yokoyama

[11] Patent Number: 4,867,767
[45] Date of Patent: Sep. 19, 1989

[54] CONDENSATE SEPARATING AND DISCHARGING DEVICE WITH A SPECIALLY DIMENSIONED TRAP SECTION

[75] Inventor: Takeshi Yokoyama, Hyogo, Japan

[73] Assignee: TLV Co., Ltd., Hyogo, Japan

[21] Appl. No.: 97,328

[22] Filed: Sep. 10, 1987

Related U.S. Application Data

[63] Continuation-in-part of Ser. No. 905,869, Sep. 10, 1986, abandoned.

[30] Foreign Application Priority Data

Sep. 17, 1985 [JP] Japan .................... 60-205629

[51] Int. Cl.$^4$ .............................................. B01D 45/12
[52] U.S. Cl. ........................................ 55/219; 55/337; 55/417; 55/459.1; 55/DIG. 23
[58] Field of Search .................. 55/169, 219, 337, 455, 55/417, 459.1, DIG. 23, 170

[56] References Cited

U.S. PATENT DOCUMENTS

| | | | |
|---|---|---|---|
| 426,880 | 4/1890 | Taylor | 55/219 |
| 1,533,835 | 4/1925 | Dawley | 55/219 |
| 2,059,521 | 11/1936 | Hawley | 55/355 X |
| 2,707,051 | 4/1955 | Mailhot et al. | 55/417 X |
| 2,726,732 | 12/1955 | Faust et al. | 55/219 |
| 3,269,097 | 8/1966 | German | 55/337 |
| 3,318,323 | 5/1967 | Pearson | 55/219 X |
| 3,378,993 | 4/1968 | Veres et al. | 55/219 |
| 3,418,789 | 12/1968 | Hoffman et al. | 55/219 |
| 3,507,098 | 4/1970 | Veres et al. | 55/219 |
| 3,559,764 | 2/1971 | Wheeler, Jr. | 55/337 X |
| 3,898,068 | 8/1975 | McNeil | 55/337 X |
| 3,901,670 | 8/1975 | Minami | 55/219 |
| 4,136,009 | 1/1979 | Samiran | 55/219 X |
| 4,409,005 | 10/1983 | McKendrick | 55/337 X |
| 4,668,256 | 5/1987 | Billiet et al. | 55/219 |
| 4,723,970 | 2/1988 | Yokoyama | 55/219 |

FOREIGN PATENT DOCUMENTS

859292 12/1940 France .................... 55/219

*Primary Examiner*—Robert Spitzer
*Attorney, Agent, or Firm*—Toren, McGeady & Associates

[57] ABSTRACT

In a condensate separating and discharging device including a separator section formed by the inner wall surface of a casing and a cylindrical member, and a trap section provided below the cylindrical member in the casing, the trap section including a condensate discharging valve having a float, and a float cover for covering the float, an improvement is provided in that distance A between a lower end of the cylindrical member and the top of the float cover and an inner diameter B of the inner wall of the body at the trap section are set in such a manner that A/B is not less than 0.4, and in that the inner wall of the casing just below the cylindrical member is formed with a downwardly widening taper of about 2°.

1 Claim, 1 Drawing Sheet

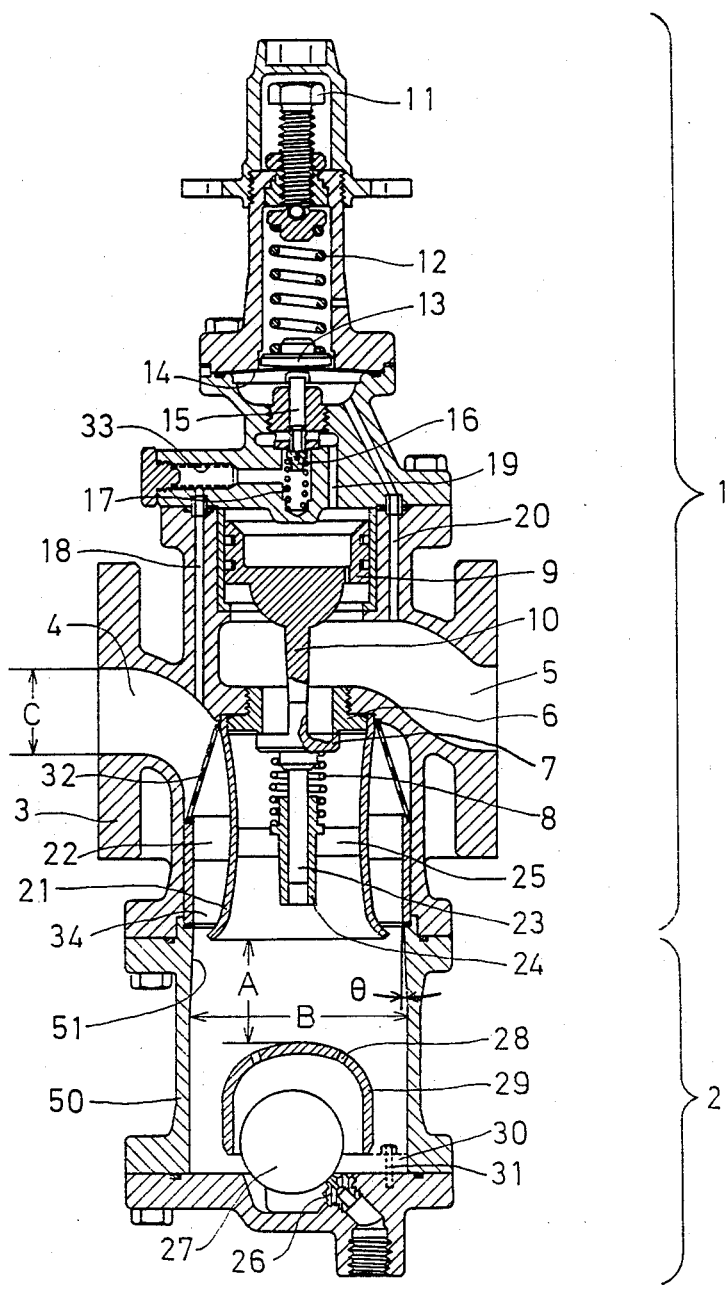

CONDENSATE SEPARATING AND DISCHARGING DEVICE WITH A SPECIALLY DIMENSIONED TRAP SECTION

This is a continuation-in-part of application Ser. No. 905,869, filed Sept. 10, 1986, now abandoned.

The present invention relates generally to a condensate separating and discharging device involving a steam trap integrally coupled to a separator to be employed in general steam piping and more particularly to a condensate separating and discharging device having an improved drain separation efficiency.

PRIOR ART

Conventionally, it is common in the art to connect together a steam trap, separator and pressure reducing valve, etc. independently formed and mounted in the steam piping.

In the prior art, it is very troublesome to provide the piping where associated equipment, such as the pressure reducing valve, separator and steam trap are installed in the steam piping. It is also troublesome to adjust each of the associated devices. To cope with this, it has been considered to couple the associated devices integrally with one another.

In a condensate separating and discharging device, having such an integral structure, a cylindrical member is provided in a casing to form a steam induction passage operating as a separator between an outer surface of the cylindrical member and an inner wall surface of the casing, so as to permit the steam induced from an inlet orifice to be swirled down along the inner wall surface of the casing and permit the steam supplied through the cylindrical member to be discharged from an exhaust orifice. Further, a steam trap section including a discharge valve having a float and a float cover covering the float is provided below the cylindrical member.

In general, the steam in the steam piping flows at high speeds, e.g., approximately 40 m/sec at the maximum, and, accordingly, the steam introduced through the steam induction passage to the steam trap section is violently swirled at high speeds. Therefore, if the distance between the lower end of the cylindrical member and the top of the float cover is short, waterdrops deposited to the float cover and condensate gathered at the bottom portion of the steam trap are whirled up in a turbulent manner by the swirling steam and they are discharged through the exhaust orifice. This problem may be solved by greatly increasing the distance between the lower end of the cylindrical member and the top of the float cover, but then the condensate separating and discharging device is disadvantageously increased in size.

SUMMARY OF THE INVENTION

The present invention is directed toward providing a device having improved separation efficiency of condensate from steam as in a condensate separating and discharging apparatus having the function of both a separator and a steam trap without making the device unnecessarily larger in size.

According to the present invention, in a condensate separating and discharging device having a separator section and a trap section, an improvement is provided in that a distance A between the lower end of a cylindrical member of the separator section and the top of a float cover and an inner diameter B of the casing at the trap section are set in such a manner that A/B is not less than 0.4, so as to improve condensate separation efficiency. The device may also be applied for separation and discharge of a drain from compressed air or any other gas as well as steam.

According to the present invention, the gas containing the condensate introduced from the inlet orifice is swirled down in the induction passage and is fed to the trap section. At this time, the condensate is separated from the steam. Then, the condensate is primarily dropped along the inner wall surface of the casing and the trap section and is gathered at the bottom portion of the trap section. On the other hand, gas rises through the cylindrical member and is discharged from the exhaust orifice. When the condensate gathered at the bottom portion of the trap section reaches a predetermined level, the float is lifted to open the discharging valve and discharges the condensate.

In the condensate separating and discharging device of the present invention, the distance A between the lower end of the cylindrical member and the top of the float cover and the inner diameter B of the trap section are set in such a manner that A/B is not less than 0.4, that is, distance A is not less than 40% of the inner diameter B. Accordingly, waterdrops deposited to the top of the float cover and the condensate gathered at the bottom portion of the trap section are not whirled up by the gas and the gas is allowed to pass through the cylindrical member and is discharged from the exhaust orifice.

The various features of novelty which characterize the invention are pointed out with particularity in the claim annexed to and forming a part of this disclosure. For a better understanding of the invention, its operating advantages and specific objectives attained by its use, reference should be had to the drawing and descriptive matter in which there is illustrated and described a preferred embodiment of the invention.

BRIEF DESCRIPTION OF THE DRAWING

In the drawing:

The FIGURE is a vertical sectional view depicting a condensate separating and discharge device having a separator and a steam trap section embodying the invention.

DETAILED DESCRIPTION OF THE PREFERRED EMBODIMENT

Now, there will be described a preferred embodiment of the present invention comprising a condensate separating and discharging device including a pressure reducing valve. Referring to the drawing, the device embodying the invention is shown as including a pressure reducing valve section 1 and a steam trap section 2 coupled to a lower end of the pressure reducing valve section. The pressure reducing valve section 1 includes an inlet orifice 4 provided at a side portion of a casing or body 3 for introducing steam at a primary pressure. An exhaust orifice 5 for exhausting steam at a secondary reduced pressure is provided at a side of the casing 3 opposite the inlet orifice 4. A main valve seat 6 is provided in the casing 3 and a main valve 7 is urged against the main valve seat 6 by a coil spring 8. A piston rod 10 of a piston 9 abuts against an upper end of the main valve 7. A secondary steam pressure adjusting screw 11 operates, when tightened, to press down a diaphragm 14 through a coil spring 12 and a pusher member 13 provided at the lower end of the coil spring 12. As a result, a pilot guide 15 is pressed down to open a pilot valve 16 against a biasing force of a coil spring 17.

A first passage 18 is provided to introduce steam at the primary pressure to a space below the pilot valve 16. A second passage 19 is provided to introduce steam at the primary pressure after passing through the pilot valve 16 to a space above the piston 9. A third passage 20 is provided to introduce steam at the secondary pressure from the exhaust orifice 5 to a space below the diaphragm 14. A strainer 32 and a screen 33 are provided, as required.

A cylindrical member 21 having a trumpet shape slightly divergent at a lower end portion is mounted on a part of the main valve seat 6 at a central portion of the body 3. The cylindrical member 21 is fixed on the inside of the casing or body 3 by means of guiding and supporting members 22 at several positions, e.g., four positions on an outer circumference of the member 21. A steam induction passage 34 acting as a separator is formed between the cylindrical member 21 and the inner circumference of the body 3. The steam passing through the steam induction passage 34 is swirled. A cylinder 24 for supporting a rod 23 of the main valve 7 is provided in the cylindrical member 21 and is mounted to an inner wall of the cylindrical member by means of four supports 25, for example.

A condensate discharging valve comprising a trap valve seat 26 and a float 27 is provided at a bottom portion of the steam trap section 2. The float 27 is covered with a dome-like float cover 29 having a small air venting hole 28 at an upper portion thereof. The float cover 29 is mounted on the bottom portion of the steam trap section 2 by means of flanges 30 and screws 31, as shown by a dotted line at two positions, for example.

According to the present invention, distance A between the lower end of the cylindrical member 21 and the top of the float cover 29 is in a certain relationship with the inner diameter B of the steam trap section 2, such that A/B is not less than 0.4 irrespective of a caliber C of the inlet hole 4 so that separation efficiency of the condensate may be improved. The following Table I shows each value of A, B and A/B providing a high separation efficiency of the condensate of 95% or more for various C in the condensate separating and discharging device.

TABLE I

| C (mm) | Distance A (mm) | Inner Diameter B (mm) | A/B |
|---|---|---|---|
| 15 | 37.2 | 70 | 0.531 |
| 20 | 37.2 | 70 | 0.531 |
| 25 | 40.9 | 79.4 | 0.515 |
| 32 | 48.8 | 103.3 | 0.472 |
| 40 | 48.8 | 103.3 | 0.472 |
| 50 | 57.9 | 131.4 | 0.441 |

In accordance with a further aspect of the invention, an inner wall portion 51 of a casing section 50 is formed with a downward flare at an angle $\theta$. The flared portion 51 commences just below the cylindrical member 21 and extends in the area between the lower end of the cylindrical member 21 and the top of the float cover 29. As shown in the drawing, the flared portion 51 terminates above the top of the cover 29, but extends in length in accordance with the distance A from a point proximate the lower end of the cylindrical member 21.

The functional effect of the downward flare 51 is that liquid discharged from the bottom end of the cylindrical member 21 impinges the flared portion 51 and is deflected more strongly downwardly. Thus, the liquid falls without interference from the upper fluid stream.

The longer the distance A and the longer the tapered portion 51, the more effective is the collection of liquid from the cylindrical member 21.

In accordance with the preferred embodiment of the invention, the angle $\theta$ is sized at 2°.

In the aforementioned embodiment, predetermined secondary steam pressure is first set by the secondary steam pressure adjusting screw 11. A part of the steam of high pressure (primary steam pressure) from the inlet orifice 4 is introduced through the first passage 18 to the space below the pilot valve 16. Then, the steam is introduced from the pilot valve 16 having a predetermined opening degree as set by the screw 11 through the second passage 19 to the space above the piston 9. As a result, the piston 9 is lowered against the biasing force of the coil spring 8 to open the main valve 7. A large part of the steam from the inlet orifice 4 is allowed to pass through the steam induction passage 34 formed between the outer circumferential surface of the cylindrical member 21 and the inner wall of the body 3 and is violently swirled down to the steam trap section 2. The condensate is dropped along the inner wall of the steam trap section 2 or collides with the float cover 29 to be dropped to the bottom portion of the steam trap section 2, while only the steam is allowed to rise in the cylindrical member 21 through the main valve 7 and is fed from the outlet hole 5 as steam at the secondary pressure. A part of the steam at the secondary pressure is fed through the third passage 20 to the space below the diaphragm 14. When the secondary steam pressure is increased, the diaphragm 14 is pressed up against the biasing force of the coil spring 12 to reduce the opening degree of the pilot valve 16, that is, the opening degree of the main valve 7 and thereby reduce the secondary steam pressure. In contrast, when the secondary steam pressure is decreased to a value equal to or greater than a set value, the opening degree of the main valve 7 is increased by an operation reversed as to the above to return the secondary steam pressure to the set value.

Thus, the steam separated from the condensate is reduced in pressure to the predetermined secondary steam pressure and is then exhausted from the outlet orifice 5.

Although the aforementioned embodiment comprises a condensate separating and discharging device including a pressure reducing valve, the condensate separation efficiency is almost not changed, even when the pressure reducing valve section is not included in the condensate separating and discharging device.

The condensate separating and discharging device according to the present invention operates as a separator for separating condensate from a gas and as a trap for discharging the condensate separated. Thus, steam piping equipment may be greatly simplified. Further, as the pressure reducing valve may be installed in the condensate separating and discharging device, it is more effective in the case where the pressure reducing valve is installed. Moreover, the dimensional relationship between distance A between the lower end of the cylindrical member and the top of the float cover and the inner diameter B of the trap section is set so as to provide a high condensate separation efficiency without increasing the dimension of the trap section. Accordingly, the condensate separating and discharging device may be made more compact as compared with the conventional case where an independent separator and trap are connected to each other. Even when the pressure reducing valve is involved in the device, the overall dimension of the device is not increased as significantly as compared with a conventional discrete pressure reducing valve and a high condensate separation efficiency of 95% or more may be obtained at the separator section.

While a specific embodiment of the invention has been shown and described in detail to illustrate the application of the inventive principles, it will be understood that the invention may be embodied otherwise without departing from such principles.

What is claimed is:

1. In a condensate separating and discharging apparatus including a vertically extending casing, an inlet orifice extending transversely of the vertical direction into said casing, a vertically extending generally cylindrical member provided in said casing opposite said inlet orifice in such a manner as to be located in spaced relation with a generally cylindrically shaped inner wall surface of said casing to define an annular separator therebetween for receiving gas containing condensate from said inlet orifice so as to permit the gas containing condensate from said inlet orifice to be swirled downwardly along said inner wall surface of said casing, an exhaust orifice for discharging gas passing upwardly through said cylindrical member to the outside of said casing, and said casing including a trap section extending vertically downwardly from said cylindrical member in said casing, said trap section including a condensate discharging valve having a float spaced downwardly form a lower end of said cylindrical member, and a vertically extending float cover for covering said float and located above said discharging valve, the improvements comprising that the lower end of said cylindrical member diverges outwardly and forms an opening for receiving gas from said annular separator, a distance A within said casing between the lower end of said cylindrical member and a top of said float cover forming a vertically extending clear open space and an inner diameter B of said inner wall surface of said casing at said trap section below the lower end of said cylindrical member are set in such a manner that A/B is not less than 0.4, said clear open space extending upwardly from the top of said float cover to the lower end of said cylindrical member, and that said inner wall of said casing at said trap section extending downwardly from the lower end of said cylindrical member is formed with a configuration flaring downwardly and slightly outwardly at an angle of approximately 2° from the vertical in the region between the lower end of said cylindrical member and the top of said float cover.

* * * * *